United States Patent [19]

Carlson et al.

[11] Patent Number: 5,194,986
[45] Date of Patent: Mar. 16, 1993

[54] OBJECTIVE LENS ASSEMBLY FOR A PORTABLE MISSILE LAUNCHER

[75] Inventors: James J. Carlson, Woodland Hills; Gary R. Noyes, Los Angeles, both of Calif.

[73] Assignee: Hughes Aircraft Company, Los Angeles, Calif.

[21] Appl. No.: 856,429

[22] Filed: Mar. 23, 1992

[51] Int. Cl.$^5$ .................. G02B 13/14; G02B 23/04
[52] U.S. Cl. .................................. 359/353; 359/356; 359/833
[58] Field of Search .............. 359/350, 353, 355, 356, 359/357, 835, 833

[56] References Cited

U.S. PATENT DOCUMENTS

| | | | |
|---|---|---|---|
| 3,464,757 | 9/1969 | Schmidt et al. | 359/353 |
| 3,529,882 | 9/1970 | Schmidt | 359/353 |
| 4,038,547 | 7/1977 | Hoesterey | 359/356 |
| 4,909,614 | 3/1990 | Itoh et al. | 359/835 |
| 5,084,780 | 1/1992 | Phillips | 359/350 |

FOREIGN PATENT DOCUMENTS 1203491 10/1965 Fed. Rep. of Germany ...... 359/353

*Primary Examiner*—Martin Lerner
*Attorney, Agent, or Firm*—C. D. Brown; R. M. Heald; W. K. Denson-Low

[57] ABSTRACT

A portable missile launcher has an optical system with a single lens (22) for receiving visible and near infrared light energy from a target (14) directing it to a prism (24) where the light is split into a part transmitted to an eyepiece (28) and a further part (30) to infrared tracking equipment (18). The objective lens (22) is a doublet having a front lens (32) and a rear lens (41) which cooperate to provide sufficiently small chormatic aberration to enable image quality correction for both visual examination and near infrared tracking.

3 Claims, 1 Drawing Sheet

OBJECTIVE LENS ASSEMBLY FOR A PORTABLE MISSILE LAUNCHER

BACKGROUND OF THE INVENTION

1. Field of the Invention

The present invention relates generally to a portable missile launcher, and, more particularly to an objective lens assembly for use in such a launcher for providing both a high powered visual telescope and for receiving electromagnetic energy from a missile beacon all through a single common aperture.

2. Description of Related Art

In a known form of a missile launcher, a missile to be tracked includes an arc lamp beacon located at the rear of the missile which emits electromagnetic energy in the near infrared region for being picked up by the missile tracking system, and, by conventional processing techniques, the location of the missile with respect to an optically/thermally viewed target is determined. The tracking system can then either be manually or automatically operated to make any changes necessary in the missile flight path to ensure contact with the target.

Portable missile launchers in the past have been constructed to include separate optical sighting apparatus and infrared sensing and tracking equipment requiring separate optical elements which must be manipulated. This, of course, results in higher production costs, complex handling procedures for the operator, decreased reliability, and increased weight and size. It is clear that to be able to provide a single optical system for handling both the visual and infrared electromagnetic energy coming from the target and missile would substantially reduce the noted disadvantages producing an overall vastly improved portable launcher.

SUMMARY OF THE INVENTION

In accordance with the practice of the present invention, a single optical system is provided for a portable missile launcher having the capability of acting as a visual telescope via which the target can be monitored and also as a near infrared tracker for following the missile beacon. A common aperture objective lens includes an achromatized air-spaced doublet made from an anomalous dispersion crown optical glass in conjunction with a standard dispersion flint glass which coact to reduce chromatic aberration over the wide spectral band of operation required.

Electromagnetic energy coming from both the target and the missile are collected by the common aperture objective lens and passed through a beam splitting Porro prism which provides good image quality to the reticle plane of the optical system eye-piece for the visual telescope. That is, the operator will not only be able to see a sharp magnified image of the target, but also a clear image of the reticle pattern.

Moreover, use of the anomalous dispersion glass ensures that chromatic aberration is satisfactorily small at the tracker infrared energy detectors. Image quality correction for both modes of operation (i.e., visual and near IR tracker) and the use of the special anomalous dispersion glass enable the desired collecting of electromagnetic information both visual and infrared from the target as well as the missile through a single objective lens.

DESCRIPTION OF A PREFERRED EMBODIMENT

Figure 1:
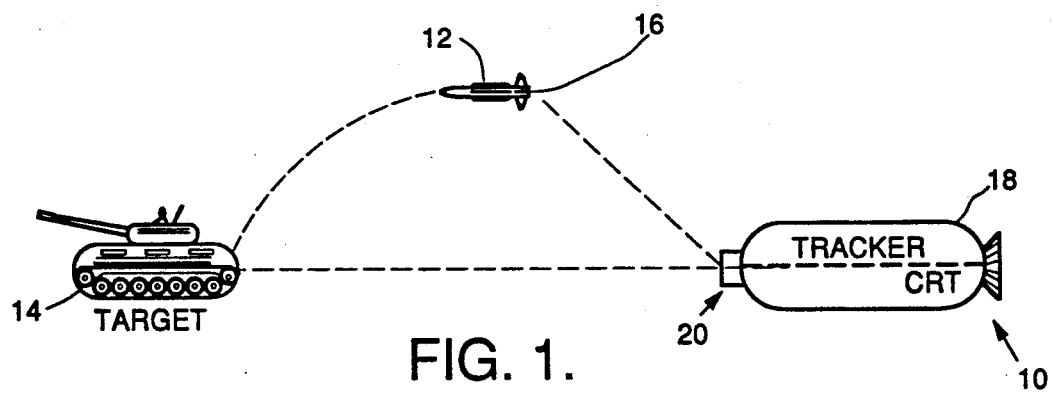
FIG. 1 is an elevational, partially schematic view of a known portable missile launcher.

With reference now to the drawing and particularly FIG. 1, a prior art portable missile launcher enumerated generally as 10 primarily operates to track a launched missile 12 during its flight toward a target 14 and has the further capability for sending control signals to change the course of the missile in order to home it in onto the target. More particularly, the missile 12 includes a xenon arc light 16 (sometimes referred to as a beacon) which emits a beam of electromagnetic energy in the near infrared region that is tracked by equipment identified generally as 18 in the missile launcher. On the other hand, the target and surroundings can be visually monitored by a telescope system 20 that has to be separately manipulated from the IR tracking system.

Figure 2:
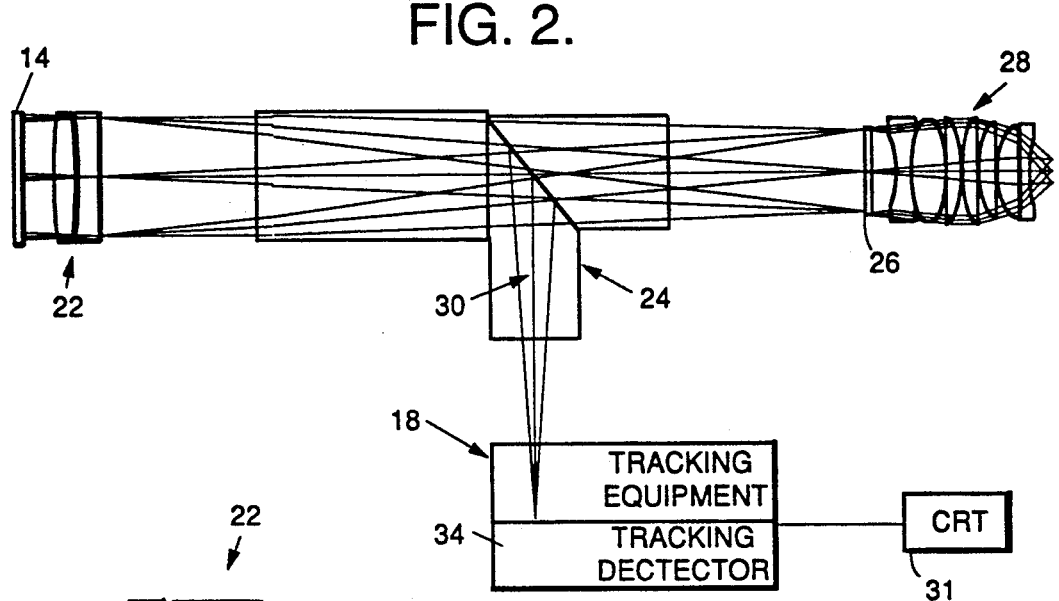
FIG. 2 is a schematic optical layout of the present invention.
Figure 3:
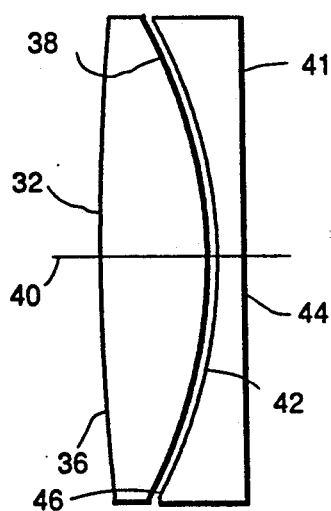
FIG. 3 is an enlarged elevational view of the doublet objective for use in this invention.

In the present invention as is particularly shown in FIG. 2, a single objective lens 22 receives the visual electromagnetic energy from the target 14 and as well the infrared energy emanating from the arc light 16 carried by the missile 12. The electromagnetic energy received by the objective lens is then passed to a Porro prism 24 which consists generally of two prisms arranged to one another in a known manner so as to pass the visual light along one path directly through a reticle 26 to an optical eyepiece 28. Also, the infrared energy received by the Porro prism assembly is redirected along a second path 30 generally 90 degrees to that taken by the visual light into the tracker assembly 18 where it is subsequently processed for producing a display on a CRT 31, for example, and for accomplishing the other functions already alluded to. A Porro prism consists generally of a pair of prisms arranged with common surfaces separated by a coating so that the device acts as a so-called "beam splitter". A more detailed description of a satisfactory Porro prism for present purposes can be found on pages 13-26 of *Military Standardization Handbook*, OPTICAL DESIGN MIL-HDBK-141, Oct. 5, 1962.

The objective lens 22 is a doublet arrangement, the front lens 32 being constructed of an anomalous dispersion glass which has as its main desirable result here of keeping the chromatic aberration sufficiently small at the tracker detectors 34 to ensure satisfactory tracker operation. More particularly, in a practical construction of the invention the front lens 32 is constructed of an anomalous crown glass referred to in the optics industry as LgSK2 having a front surface circular radius of curvature 36 of 8.52429 inches, a back radius of curvature 38 of −5.22041 inches, and thickness along optical axis 40 of 0.600000 inches. The rear lens 41 of the doublet is constructed of standard flint glass commonly referred to as BaSF50 having a front radius of curvature 42 of −5.22467 inches, a back surface radius of curvature 44 of −20.2942, and a thickness along the optical axis 0.250000 inches. The two lenses are separated by a constant air space 46 of 0.031788 inches.

In the practice of the present invention, the image of the IR beam from the missile by which the missile is being tracked and the visual image of the target and missile enter the portable launcher via a single aperture, rather than through two separate forward looking apertures as in the prior art apparatus. This is advantageous, first of all, in eliminating the need for separate manipulation of apparatus by the operator during visual and IR tracking. Considering the anxious circumstances under which the described equipment may be operated, the benefit derived from increased simplicity of handling is manifest. Also, although in one known prior art launcher the optical system required six separate optical elements, in contrast there are only three needed in the present invention. This latter feature results in reduced size and weight, along with a corresponding reduction in manufacturing cost, and with a plus of increased reliability.

Although the invention has been described in connection with a preferred embodiment, it is to be understood that those skilled in the appertaining arts may suggest modifications that come within the spirit of the described invention and the ambit of the appended claims.

What is claimed is:

1. An optical system for a portable missile launcher including a Porro prism for receiving light having near infrared and visible light components from a target and the missile and transmitting the same along both a first path to an eyepiece and along a second path to means for processing and displaying the near infrared light, comprising:

a single objective lens located in light receiving position between the Porro prism and the target providing chromatic aberration between incident infrared and visible light components sufficiently small to enable image quality correction for both visual examination via the eyepiece and for processing and displaying the near infrared components;

said objective lens including a doublet having a front lens constructed of an anomalous dispersion glass and a rear lens constructed of a flint glass, said front and rear lenses being separated by an air space;

said front lens having a front surface radius of curvature of 8.52429 inches, a back radius of curvature of −5.22041 inches, and a thickness along a central axis of 0.600000 inches; and said rear lens having a front radius of curvature of −5.22467 inches, back surface radius of curvature of −20.2942 inches, and a thickness along a central axis of 0.250000 inches.

2. An optical system as in claim 1, in which the front lens is constructed of an LgSK2 anomalous crown glass and the rear lens is constructed of a BaSF50 flint glass.

3. A single aperture missile launcher optical system for receiving infrared energy components from a missile carried source and visible light components from a target and transmitting the same to an eyepiece for visual examination and to means for displaying the infrared light components, comprising:

a single doublet objective lens for receiving both the visible and infrared light components from the target including a front lens constructed of an anomalous dispersion glass and a rear lens constructed of a flint glass; said front lens having a front surface radius of curvature of 8.52429 inches, a back radius of curvature of −5.22041 inches, and thickness along a central axis of 0.600000 inches; and said rear lens having a front radius of curvature of −5.22467 inches, a back surface radius of curvature of −20.2942 inches, and a thickness along a central axis of 0.250000 inches.

* * * * *